Figure 1:
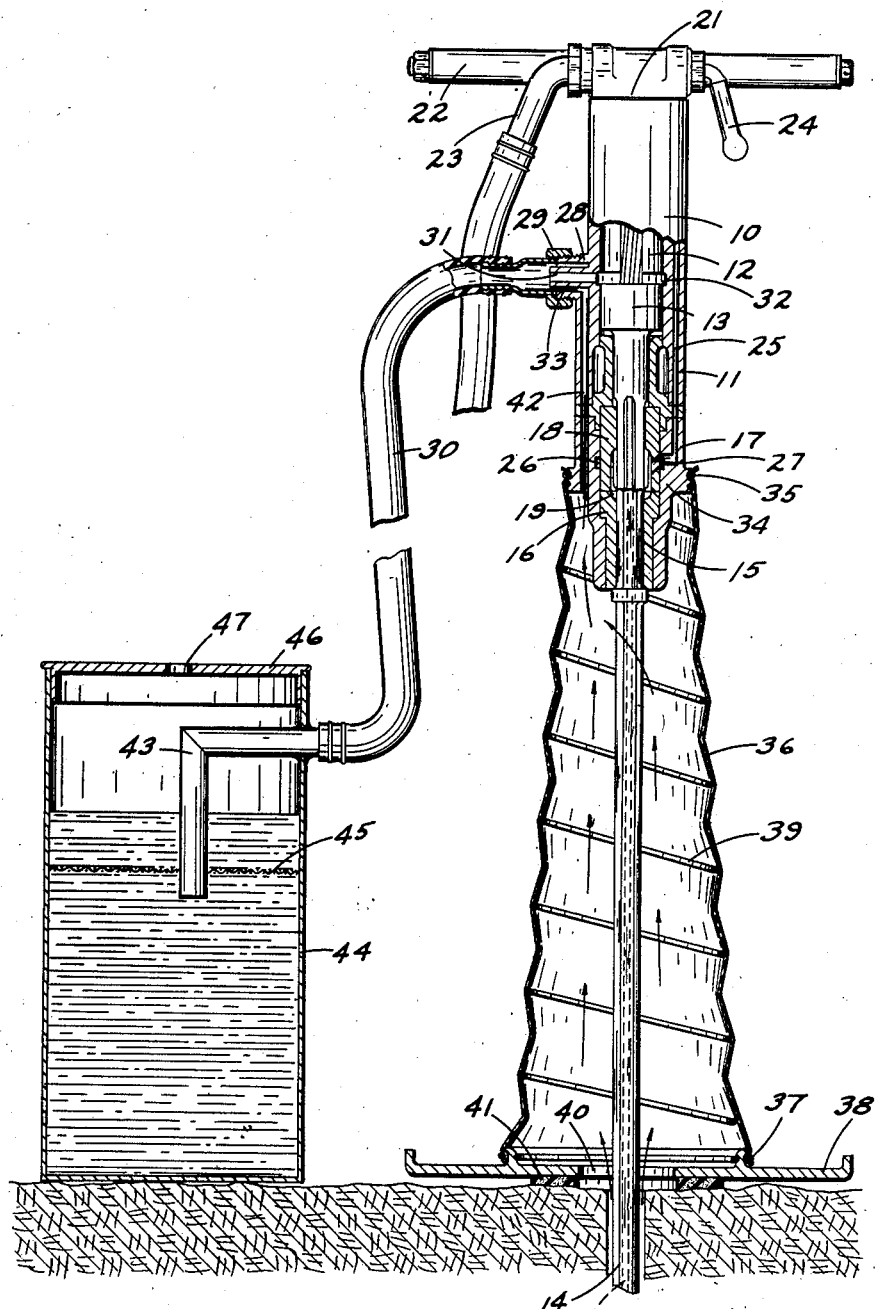

Patented July 5, 1938

2,122,517

UNITED STATES PATENT OFFICE 2,122,517

DUST ELIMINATOR

John C. Curtis, Garfield Heights, Ohio, assignor to The Cleveland Rock Drill Company, Cleveland, Ohio, a corporation of Ohio Application January 2, 1937, Serial No. 118,895

3 Claims. (Cl. 255—50)

This invention relates broadly to a dust eliminating device, but more particularly to a device especially adapted to be used in connection with a rock drill for removing the dust resulting from the drilling operation.

Heretofore, dust eliminators were provided as an independent device which were affixed to or otherwise secured around the drill steel for carrying away the dust from the drill hole. Such devices were usually of the hood type fitting over the drill hole and having an axial opening allowing the passage of the drill steel. To the hood was generally secured one or more flexible conduits intended to create a vacuum condition within the hood for carrying the dust away from the drill hole and consequently away from the operator. These devices in many cases were found so cumbersome that it was difficult to have them used by the operator who preferred to handle the drill in the regular way without being hampered by the dust eliminator and the flexible conduit or conduits attached thereto.

It is therefore one object of this invention to produce a dust eliminator adapted to be secured to the rock drill so as to form a part of the machine, and consequently being movable about the work with the machine without requiring special attention from the operator.

Another object of this invention is to provide a rock drill equipped with a dust eliminating device wherein suction is created by the fluid normally exhausting from the rock drill, and the dust is carried away from the operator by the exhausting fluid.

Another object of this invention is to provide a rock drill with a dust eliminator comprising a flexible hood or casing surrounding the drill steel and having one end attached to the rock drill while the other end carries means affording a fluid tight joint with the rock or work being drilled, the casing being adjustable in height to enable the drill to be moved toward or away from the work without breaking the fluid tight joint between the casing and the work.

A further object of this invention is to produce a simple and inexpensive dust eliminator which is strong, durable and efficient.

Figure 2:
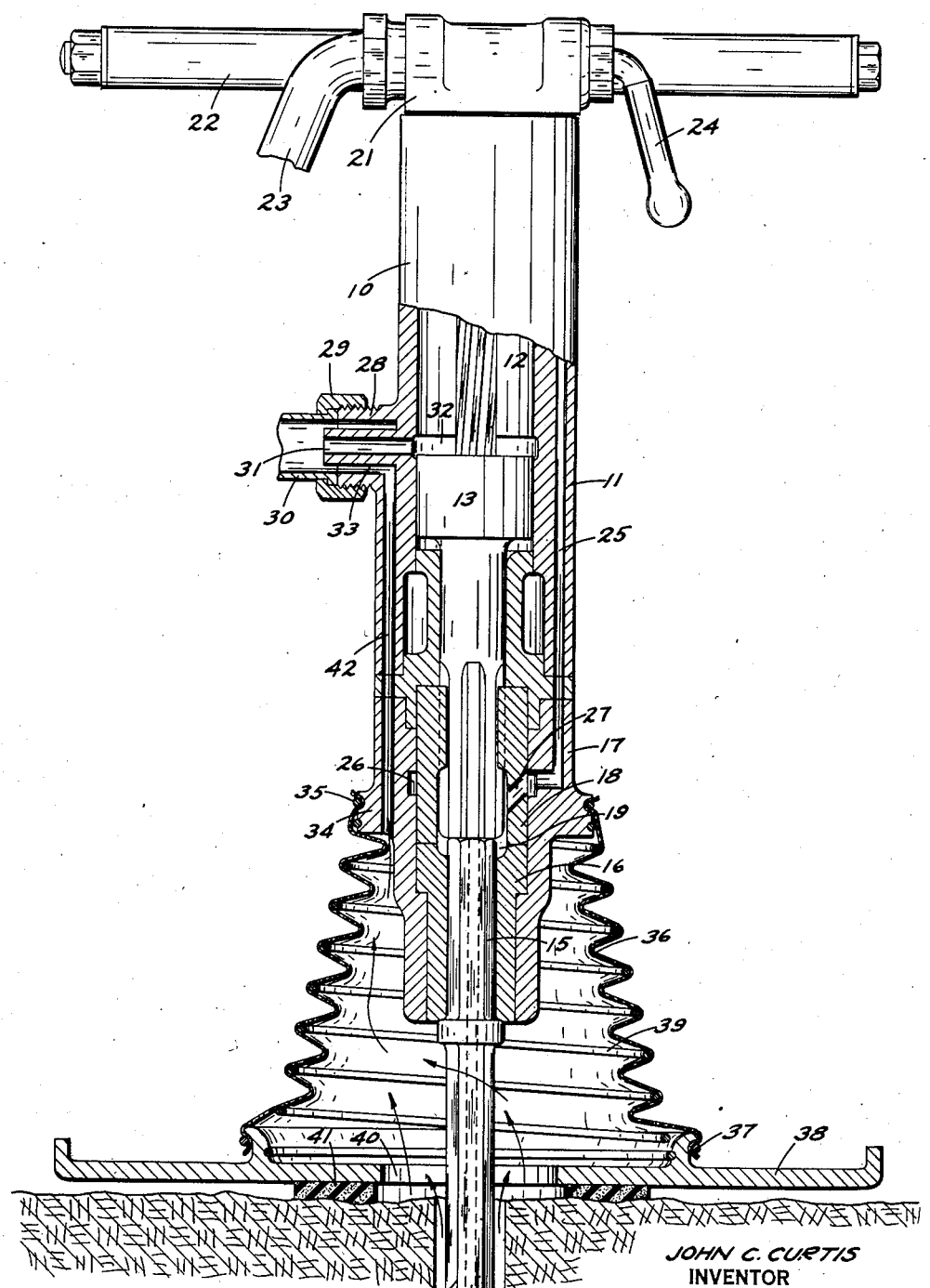

In the drawings which illustrate one preferred form of the invention:

Fig. 1 is a side elevational view partly in section having the invention applied thereto, the casing being shown in the extended position, and Fig. 2 is an enlarged view similar to Fig. 1, the casing being shown in a retracted or compressed position.

Referring to the drawings in which like symbols designate corresponding parts throughout the several views, 10 represents a fluid actuated rock drill of the sinker type comprising a casing 11 formed with a cylindrical chamber 12. Within this chamber there is reciprocably mounted a hammer piston 13 capable of delivering impacts to a drill steel 14 having a shank 15 slidably mounted within a chuck 16, which chuck is rotatably mounted within a front housing 17. The chuck 16 is operatively connected to the piston 12 by a chuck sleeve 18, which is formed with a chamber 19 accommodating the end of the drill steel 14. The drill steel is preferably formed with a hole 20 extending axially therethrough for conveying cleaning fluid to the bottom of the drill hole.

To the upper end of the casing 11 is secured a head 21 carrying a handle 22 and having a motive fluid connection 23, through which motive fluid may be admitted into a throttle valve operable by a handle 24. From the throttle valve the motive fluid may be admitted into the cylindrical chamber 12 for actuating the piston 13, or into the chamber 19 of the chuck sleeve 18 through a port 25, a groove 26 and a passage 27, from where it may be admitted to the bottom of the drill hole for cleaning the latter.

On one side of the cylindrical casing 11, there is provided an externally threaded boss 28 adapted to receive a nut 29 by which a flexible conduit 30 is secured to the casing. Centrally disposed through the boss 28, there is an exhaust port 31 opening into an exhaust groove 32 formed intermediate the ends of the cylindrical chamber 12. Around the port 31, the boss 28 is internally machined to form an annular groove 33 also opening into the conduit 30.

Intermediate its ends, the front housing 17 is formed with an annular flange 34 having secured thereto in fluid tight engagement therewith by a spring clip 35 one end of a hood or casing 36, while the other end of the casing is secured by a spring clip 37 to a foot rest or plate 38. The casing 36 is preferably made of flexible material such as leather or rubber, and is shaped like a bellows to permit its expansion or retraction. Mounted within the casing in supporting relation therewith, there is a compression spring 39 seated on the annular flange 34 and the plate 38 for constantly urging the latter away from the former. The plate 38 is provided with a centrally located bore 40 extending therethrough to enable the free passage of the drill steel 14. Around the bore 40, there is secured to the lower end wall of the plate 38 a ring of soft or sponge rubber 41 adapted to engage the work in fluid tight relation therewith.

Leading from the annular groove 33, there is a port 42 opening into the casing 36.

In the present construction, the flexible conduit 30 is shown connected to the inlet end of a pipe 43 protruding from a dust collector receptacle 44. The outlet end of this pipe is submerged by liquid such as water, and extends through a screen 45 located well below the water level. The receptacle is provided with a removable cover 46 having a port 47 therethrough.

For operation, the device is positioned as shown in the drawings, with the rubber ring 41 in forcible fluid tight engagement with the work due to the action of the compression spring 39. To assure this fluid tight joint, especially when drilling on very uneven ground, the operator may stand on the plate 38.

During the normal operation of the rock drill, the motive admitted into the cylindrical chamber 12 for actuating the piston 13, will exhaust therefrom at a relatively high velocity into the conduit 30 via the exhaust groove 32 and exhaust port 31, and thereby create a vacuum or suction within the annular groove 33 surrounding the port 31. Since the groove 33 is connected with the interior of the casing 36 through the passage 42, and the interior of the casing is directly connected with the drill hole through the bore 40, the dust and small cuttings resulting from the drilling operation will be drawn into the groove 33 and conduit 30, from where it will be carried by the exhausting fluid into the receptacle 44 through the conduit 30 and pipe 43. In the receptacle 44, the motive fluid laden with dust will be filtered through the liquid contained within the receptacle, and will thereafter exhaust to the atmosphere through the port 47, while the dust retained by the liquid will accumulate on the bottom of the receptacle. Before reaching the liquid level, the exhausting fluid will flow through the screen 45, thereby preventing dust containing bubbles to reach the liquid level and the dust contained therein to be carried to the atmosphere by the exhausting fluid.

When it is desired to blow the cuttings from the drill hole, motive fluid may be admitted into the chamber 19 of the chuck sleeve 18, via the port 25, groove 26 and passage 27. From the chamber 19 the motive fluid may be admitted to the bottom of the drill hole through the port 20 of the drill steel 14. The dust and cuttings thus blown from the drill hole will accumulate within the casing 36, and will, during the normal operation of the rock drill, be carried therefrom into the receptacle 44 in the manner previously described.

The casing 36 is shaped like bellows to permit its adaptation irrespective of the position of the rock drill relative to the work or ground being drilled. In practice, due to the standard length of drill steels, the rock drill is never positioned much over two feet from the work. In this instance, the casing will assume the extended position shown in Fig. 1. When the rock drill approaches the work, the casing will assume the compressed position shown in Fig. 2.

From the foregoing description, it is evident that the dust collection receptacle may be replaced by any suitable receptacle such as a bag used in ordinary vacuum cleaner. It is also evident that the extension of the casing need not be limited to two feet, and that other suitable casings such as bags or the like may be substituted for the bellows shaped casing shown and described, without departing from the scope and spirit of the invention as herein claimed.

I claim:

1. In a device of the character described, the combination of a rock drill having a drill steel extending therefrom and an exhaust port having pressure fluid flowing therethrough, a casing carried by the rock drill and engageable with the work in surrounding relation with the drill steel, and means for creating suction within said casing due to the flow of the pressure fluid through said exhaust port including a passageway within said rock drill having one end opening into said casing and the other end opening near the outlet end of said exhaust port.

2. In a device of the character described, the combination with a fluid motor having a housing and a rock drilling tool implement extending therefrom, a dust conveying passage within said housing, and a flexible casing within which said passage opens, said casing surrounding said tool implement and extending from said housing to the work for conducting the dust from the work to said passage.

3. In a device of the character described, the combination with a fluid motor having a housing and a rock drilling tool implement extending therefrom, an exhaust port for said motor having pressure fluid flowing therethrough, a conduit within which said exhaust port opens, a dust conveying passage within said housing having one end opening into said conduit, a flexible casing within which the other end of said passage opens, said casing surrounding said tool implement and extending from said housing to the work for conducting the dust to said passage, the opening of said passage relative to said exhaust port being arranged and disposed in a manner causing suction within said passage due to the flow of the fluid through said port for conveying the dust from said casing into said conduit.

JOHN C. CURTIS.